US007558880B2

(12) United States Patent
Yoshimoto

(10) Patent No.: US 7,558,880 B2
(45) Date of Patent: Jul. 7, 2009

(54) DYNAMIC DNS REGISTRATION METHOD, DOMAIN NAME SOLUTION METHOD, DNS PROXY SERVER, AND ADDRESS TRANSLATION DEVICE

(75) Inventor: Tetsuro Yoshimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 10/631,746

(22) Filed: Aug. 1, 2003

(65) Prior Publication Data

US 2005/0021841 A1 Jan. 27, 2005

(30) Foreign Application Priority Data

Apr. 10, 2003 (JP) ............................. 2003-106499

(51) Int. Cl.
*G06F 15/16* (2006.01)
n
(52) U.S. Cl. ...................... 709/245; 709/219; 709/230; 709/218
(58) Field of Classification Search ................. 709/245, 709/217, 235, 230, 218, 219
See application file for complete search history.

(56) References Cited

U.S. PATENT DOCUMENTS

| 6,434,627 | B1 * | 8/2002 | Millet et al. ................ 709/245 |
| 2003/0219023 | A1 * | 11/2003 | Miyata et al. .......... 370/395.53 |
| 2003/0225900 | A1 * | 12/2003 | Morishige et al. ........... 709/230 |
| 2006/0212599 | A1 * | 9/2006 | Lucco et al. ................ 709/245 |

OTHER PUBLICATIONS

P. Vixie, et al., "Dynamic Updates in the Domain Name System (DNS Update)", Network Working Group, Standards Track, pp. 1-26, Apr. 1997.
G. Tsirtsis, et al., "Network Address Translation—Protocol Translation (NAT-PT)", Networking Working Group, Standards Track, pp. 1-21, Feb. 2000.

* cited by examiner

*Primary Examiner*—William C Vaughn, Jr.
*Assistant Examiner*—Djenane M Bayard
(74) *Attorney, Agent, or Firm*—Brundidge & Stanger, P.C.

(57) ABSTRACT

The present invention relates to a domain name solution method in dynamic DNS and a device for domain name solution. A dynamic DNS server includes an address translation means which assigns a host a virtual address corresponding to an actual address of the host. The dynamic DNS registration method comprises a step in which the address translation means assigns a virtual address to the host upon a registration request issued from the host and a step of storing a tuple of the actual address, virtual address, and domain name of the host, which are associated with each other.

6 Claims, 12 Drawing Sheets

DYNAMIC DNS REGISTRATION METHOD, DOMAIN NAME SOLUTION METHOD, DNS PROXY SERVER, AND ADDRESS TRANSLATION DEVICE

BACKGROUND OF THE INVENTION

1. Field of the Invention

The present invention relates to a network using DNS and in particular to a method of and a device for domain name solution in dynamic DNS.

2. Description of Related Art

When attempting to communicate with a node over an IP network such as the Internet, it is seldom to directly specify the IP (Internet Protocol) address of a destination host to which access is attempted. Instead, a common practice for network access and communication is to use a Domain Name System (DNS) where a domain name is used to specify the access destination. A DNS server holds IP address to domain name mappings. By request from a host, the IP address of the host is registered on the DNS server, mapped to its domain name. By request from a host, the DNS server translates the host's domain name into its IP address (or vice versa). This translation is called "domain name solution."

Commonly, a domain name mapped to a static IP address has been registered in the DNS. However, with the development of dynamic address assignment techniques such as a Dynamic Host Configuration Protocol (DHCP), it has become necessary to register a dynamic address mapped to a domain name. Then, in RFC (Requests for Comments) 2136, dynamic IP address and domain name registration (dynamic DNS) definitions and rules were specified. Using this dynamic DNS, it made possible to make access by domain name to a host that runs the DHCP or the like and does not have a fixed address. Besides, in an IPv6 environment, because automatic and dynamic IP address assignment is fundamentally practiced, the importance of the dynamic DNS is considered becoming increasingly great.

FIG. 10 is a schematic diagram showing a network system using the above dynamic DNS of prior art. Reference symbols S1 to S26, D1, and D2 denote DNS servers which make translation between a static IP address and a domain name. Reference symbol D0 denotes a DNS server which makes translation between a dynamic IP address and a domain name. Reference symbols C1 and C2 denote servers called cache servers which send a request for translation between an IP address and a domain dame to a DNS server on behalf of a host. Reference symbols H1 and H2 denote hosts.

Also, the DNS servers S1 to S26 and D0 to D2 exist on a network such as the Internet and are organized in a tree structure wherein the DNS server S1 is positioned at the root. By tracing the tree structure from the DNS server S1 positioned at the root (which is referred to as the "root server") to lower hierarchies of the tree, any domain name or IP address for any host connected to the network can be looked up.

FIG. 11 illustrates examples of IP address to domain name mapping tables which are used for translation, held by the DNS servers shown in FIG. 10. Reference symbol "TS1" in FIG. 11 denotes an IP address to domain name mapping table held by the DNS server "S1."

Using this drawing, by a query from the host H2, a procedure for deriving the IP address of the host H1 from its domain name "pc-1.isp1.com" (this process is referred to as a "forward lookup") will be described below.

When having received a request for IP address solution from the "pc-1.isp1.com" domain name, the cache server C2 queries the root server S1 about the domain name. Because the data registered in the table TS1 on the root server S1 indicates that the DNS server S11 has detailed information on the domain name ending with ".com," the root server S1 directs the cache server C2 which is the source of the query to issue a query to the DNS server S11 accordingly. When having received this directive, the cache server C2 issues a query to the DNS server S11 about the domain name.

Because the data registered in the table TS11 held by the DNS server S11 indicates that the DNS server D1 has detailed information on the domain name in which an ".isp1" string precedes the ".com" string, the DNS server S11 directs the cache server C2 which is the source of the query to issue a query to the DNS server D1 accordingly. When having received this directive, the cache server C2 issues a query to the DNS server D1. Because the data registered in the table held by the DNS server D1 indicates that IP address "1.1.1.1" corresponds to the domain name in which a "pc-1" string precedes the ".isp1.com" string, the DNS server D1 answers the cache server C2 which is the source of the query that the IP address corresponding to the "pc-1.isp1.com" name is "1.1.1.1" accordingly. When having received this answer, the cache server C2 answers the host H2 which is the initial source of the query that the IP address corresponding to the "pc-1.isp1.com" domain name is "1.1.1.1". Through the above-described procedure, the IP address is derived from the domain name.

Next, a procedure for deriving a domain name from an IP address (this process is referred to as a "reverse lookup") will be described.

When a reverse lookup is performed, a special domain name for query purposes for translation from an IP address is generated. If an IPv4 protocol is applied, the above name is created in a decimal notation of an address with dot delimiters "." in which each value consisting of eight bits is separated with a dot, starting with the lowest position value of the original IP address and ending with an ".in-addr.arpa" string. For example, from a "2.2.2.1" IPv4 address, a special domain name for query purposes "1.2.2.2.in-addr.arpa" is generated. Using this domain name, a series of queries from the root server is performed in the same manner as described above; that is, a number of queries are repeated in a route S1->S21->S22->S24->S26 and, finally, the query route arrives at the DNS server D2. The data registered in the table TD2 held by the DNS server D2 indicates that domain name "term-2.isp2.com" corresponds to "1.2.2.2.in-addr.arpa". Through the above-described process, it is figured out that "term2.isp2.com" is the domain name corresponding to the "1.2.2.2.in-addr.arpa" domain for reverse lookup, or in other words, IP address "2.2.2.1".

If an IPv6 protocol is applied, a query domain name is created in a hexadecimal notation of an address with dot delimiters "." in which each value consisting of four bits is separated with a dot, starting with the lowest position value of the original IP address and ending with an ".ip6.arpa" string. For example, from a "0123:4567:89ab:cdef:0123:4567:89ab:cdef" IPv6 address, a special domain name for query purposes "f.e.d.c.b.a.9.8.7.6.5.4.3.2.1.0.f.e.d.c.b.a.9.8.7.6.5.4.3.2.1.0.ip6.arpa" is generated. In the case of IPv6, the same reverse lookup procedure as for IPv4 is performed.

Next, as an example of dynamic DNS operation, a process in which resolving a domain name of the host H2 is performed by request from the host H1 will be described, using a sequence diagram of FIG. 12.

In advance of use of dynamic DNS, the host H2 sends the dynamic DNS server D0 a registration request message 0101 to register its address mapped to its domain name "host-b.vdm.com" on the server. Similarly, the host H1 sends the server D0 a registration request message 0102 to register its address "1.1.1.1" mapped to its domain name "host-a.vdm.com" on the server.

The host H1 sends the cache server C1 in its local network a query message 0103 which requests the cache server to find a solution of IP address corresponding to the "host-b.vdm.com" domain name. Through a series of queries from the root server S1 as described above, the cache server C1 knows that the DNS server D0 has mapping information on the "host-b.vdm.com" domain name and sends the DNS server D0 a query message 0104. The DNS server D0 sends back to the cache server C1 an answer message 0105 that the address "2.2.2.1" corresponds to the "host-b.vdm.com" domain name and the cache server C1 transfers the answer to the host H1 (0106).

Using the address "2.2.2.1" obtained through the above procedure, the host H1 sends a packet 0107 to the host H2, thus becoming able to communicate with the host H2.

[Non-Patent Document 1]

P. Vixie et al., "RFC2136," "online," December, 1997, Internet <URL:http://www/ietf.org/rfc/rfc2136.txt>

In the dynamic DNS of prior art, if a host which has been assigned a dynamic IP address by, for example, an Internet Service Provider (ISP) under the DHCP or the like has registered its domain name with a dynamic DNS server, the domain name concatenated with the ISP's domain is derived through a reverse lookup from the IP address to the domain name, because the IP address has been assigned by the ISP not the domain manager. In other words, the ISP has the right of management of the DNS server which executes the reverse lookup and, consequently, it has been impossible to register a non-ISP domain name that can be reversely looked up in dynamic DNS.

Therefore, even if attempts are made to exert access control over hosts, for instance, to limit hosts that can attempt access to those within a same domain or even if attempts are made to know the domain name of the source of access request from its IP address in order to check for illegal access and the like, its dynamic DNS-based domain name cannot be obtained by a reverse lookup from the IP address in the dynamic DNS of prior art.

FIG. 13 is a sequence diagram explaining a flow of such a reverse lookup process.

When a packet 0107 from the host H1 arrives at the host H1, the host H2 sends the cache server C2 a request 0201 for an IP address to domain name translation, using the source address "1.1.1.1" specified within the packet 0107, in order to check what domain under which the host that sent the packet 0107 has been registered.

The cache server C2 issues queries to the root server S1 and other DNS servers having information on the "1.1.1.1" address sequentially. Then, the cache server C2 knows that the DNS server D1 has the mapping information on the "1.1.1.1" address and sends the DNS server D1 a query message 0202. Because the data registered in the table TD1 held by the DNS server D1 indicates that the "pc-1.isp1.com" domain name corresponds to the "1.1.1.1" address, the DNS server D1 sends back to the cache server C2 an answer message 0203 with the "pc-1.isp1.com" domain name.

As a result, the host H2 is informed that the "pc-1.isp1.com" domain corresponds to the "1.1.1.1" address. Therefore, the host H2 cannot know that the host H1 with the "1.1.1.1" address also has the "host-b.vdm.com" domain name and that the packet 0107 was sent from the host under the "vdm.com" domain.

SUMMARY OF THE INVENTION

It is an object of the present invention which has been devised in addressing the foregoing problem to provide a network environment where an appropriate domain name can be known from an IP address through a reverse lookup even in environment using dynamic DNS.

According to the present invention, a reverse lookup from an address to a domain name in dynamic DNS can definitely be executed without altering a network configuration for actual transfer and, consequently, domain name operation and management including authenticating the other party to communicate with can be freed from the existing restrictions and network services can be advanced.

The foregoing problem arises from that a plurality of domain names are assigned to a single IP address by different management executors. To prevent this, in the present invention, when a new domain name of a node is registered on a dynamic DNS server, a virtual IP address corresponding to the domain name is assigned to the node. Specifically, a DNS proxy server which has functions to receive DNS queries on behalf of the DNS server, execute predetermined operation when having received a specific query, and transfer any other query to the DNS server and an address translation device which has functions to execute virtual address assignment by request from the DNS proxy server are added to the network. When the DNS proxy server receives a dynamic DNS registration request from a node, it requests the address translation device to make virtual address assignment to the node and executes dynamic DNS registration of the node to the actual DNS server, using the virtual address assigned to the node. In addition to the requested registration for a forward lookup, registration for a reverse lookup is performed at the same time. Upon a deregistration request for a dynamic DNS entry, the dynamic DNS entry and associated virtual address are deleted.

DETAILED DESCRIPTION OF THE PREFERRED EMBODIMENTS

The present invention now is fully described hereinafter through a preferred embodiment of the invention and with reference to the accompanying drawings.

Figure 1:
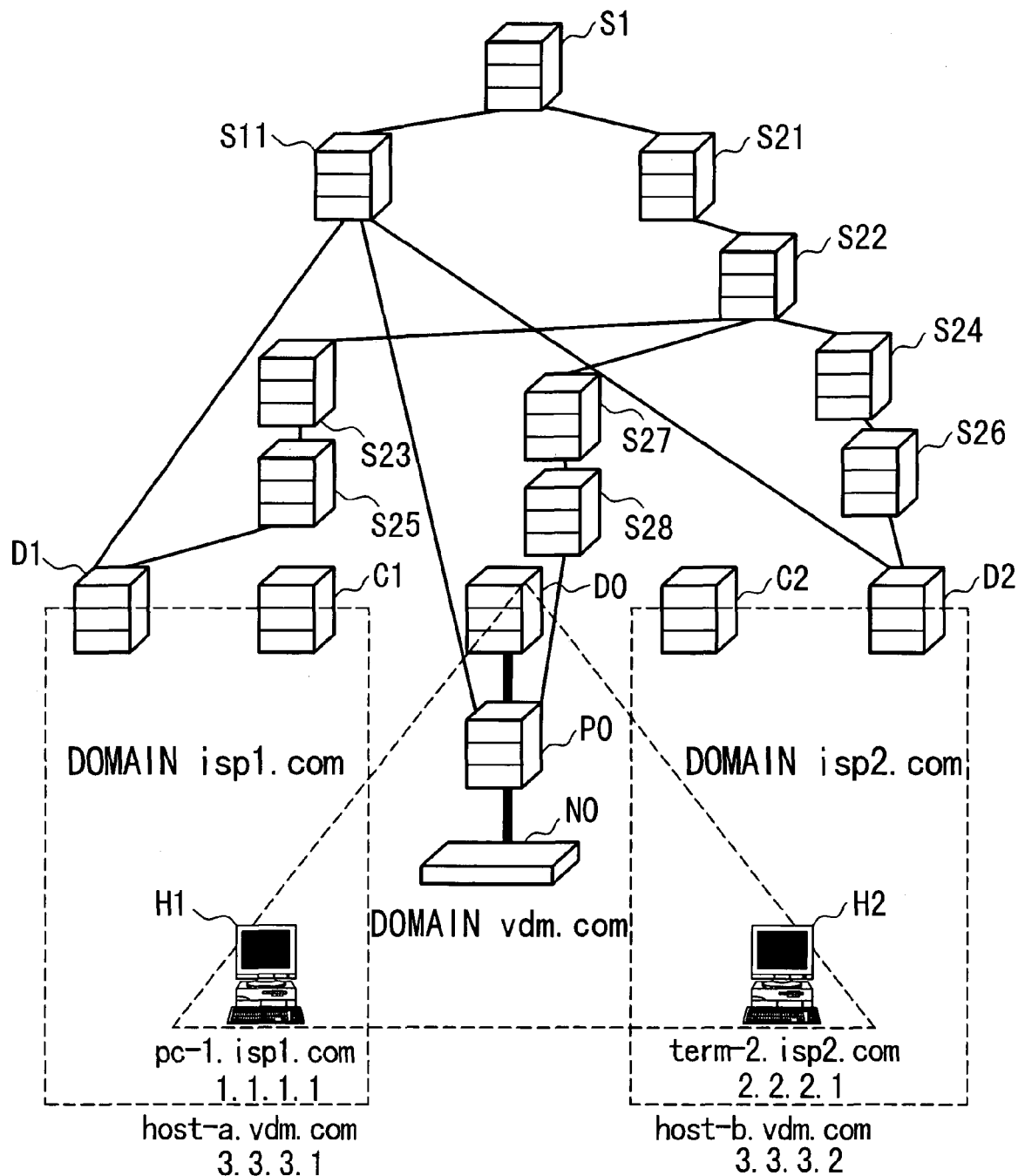
FIG. 1 is a schematic diagram showing a network system structure according to a preferred embodiment of the present invention.

FIG. 1 is a schematic diagram showing a network system structure according to a preferred embodiment of the present invention.

Reference symbols S1 to S26, D1, and D2 denote DNS servers which make translation between a static IP address and a domain name. Reference symbol D0 denotes a DNS server which makes translation between a dynamic IP address and a domain name. These DNS servers are interconnected through a network such as the Internet and organized in a tree structure in which the DNS server S1 is positioned at the root. Reference symbols C1 and C2 denote servers called DNS cache servers which send a request for translation between an IP address and a domain dame to a DNS server on behalf of a host. Reference symbols H1 and H2 denote hosts which are computers that issue a request as clients in the system.

A DNS proxy server P0 is set so that other servers can make access to it by specifying the IP address of the dynamic DNS server D0 as the destination and appears to the other nodes on the network to be the DNS server D0 as such. Direct access to the DNS server D0 is possible from the DNS proxy server P0 only.

An address translation device N0 generates a virtual address from an IP address, according to a request of the DNS proxy server P0 and makes mutual translation between an IP address specified within a packet transferred to it and the associated virtual address. Reference symbols S27 and S28 denote DNS servers which hold mapping tables in which a domain name is mapped to a virtual address generated by the address translation device N0. In the preferred embodiment of the present invention, a range of virtual addresses which the address translation device N0 generates is assumed to be "3.3.3.1" to "3.3.3.254". Besides, the network is set to transfer any packet having a virtual address as the destination to the address translation device N0.

Figures 2, 4:
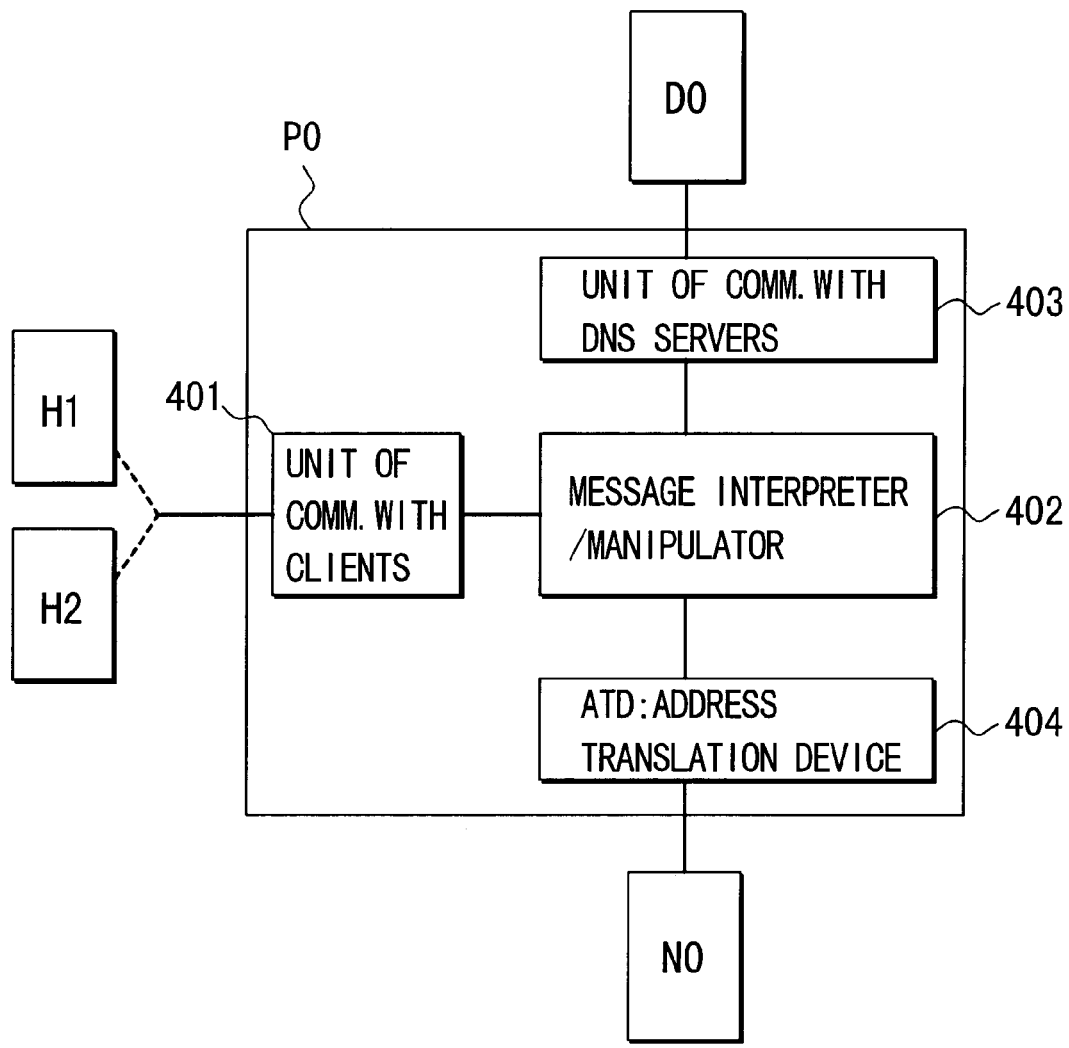
FIG. 2 is a block diagram showing a preferred configuration of the DNS proxy server in the network system of the preferred embodiment of the present invention.
FIG. 4 illustrates examples of address to virtual address mapping tables held by the address translation device in the network system of the preferred embodiment of the present invention.

FIG. 2 is a block diagram showing a preferred configuration of the DNS proxy server P0.

A unit of communication with clients 401 receives a DNS message from a client on behalf of the DNS server and passes it to a message interpreter/manipulator 402. Also, the unit of communication with clients 401 receives a DNS message from the message interpreter/manipulator 402 and sends it to a client.

The message interpreter/manipulator 402 receives a DNS message from the unit of communication with clients 401, interprets the received DNS message content, and executes predetermined processing. Also, the message interpreter/manipulator 402 receives a message from a unit of communication with DNS servers 403 or a unit of communication with address translation device 404, interprets the message, and executes predetermined processing.

Specifically, if a DNS message passed from the unit of communication with clients 401 is a dynamic DNS registration request, the message interpreter/manipulator 402 generates a request for virtual address assignment with the IP address of the requester node which is specified within the dynamic DNS registration request and sends this request through the unit of communication with address translation device 404 to the address translation device N0. When having received the request for virtual address assignment, the address translation device N0 assigns the requester node a virtual address associated with the IP address of the node. The message interpreter/manipulator 402 receives the virtual address assigned to the node by the address translation device N0 through the unit of communication with address translation device 404 and generates a new dynamic DNS registration request in which the IP address of the requester node is replaced by the virtual address assigned to the node by the address translation device N0. At the same time, the message interpreter/manipulator 402 generates another dynamic DNS registration request for a reverse lookup and sends the first dynamic DNS registration request and the second dynamic DNS registration request for a reverse lookup through the unit of communication with DNS servers 403 to the DNS server D0. When the dynamic DNS registration of the node is completed on the DNS server D0, the DNS proxy server P0 receives a reply from the DNS server D0 through the unit of communication with DNS servers 403 and sends a message that the dynamic DNS registration has been completed to the host that is the requester client node through the unit of communication with clients 401.

If the message interpreter/manipulator 402 receives a DNS message that is not a dynamic DNS registration request, the message interpreter/manipulator 402 transfers the DNS message as is through the unit of communication with DNS servers 403 to the DNS server D0. The DNS proxy server P0 receives results of processing performed by the DNS server D0 in accordance with the message content through the unit of communication with DNS servers 403 and sends the results as is through the unit of communication with clients 401 to the host that is the client node.

The unit of communication with DNS servers 403 receives a DNS message from the message interpreter/manipulator 402 and transfers it to a DNS server as well as it receives a reply from the DNS server and passes it to the message interpreter/manipulator 402.

The unit of communication with address translation device 404 receives a request for virtual address assignment from the message interpreter/manipulator 402 and transfers it to the address translation device N0 as well as it receives a reply from the address translation device N0 and passes it to the message interpreter/manipulator 402.

Figure 3:
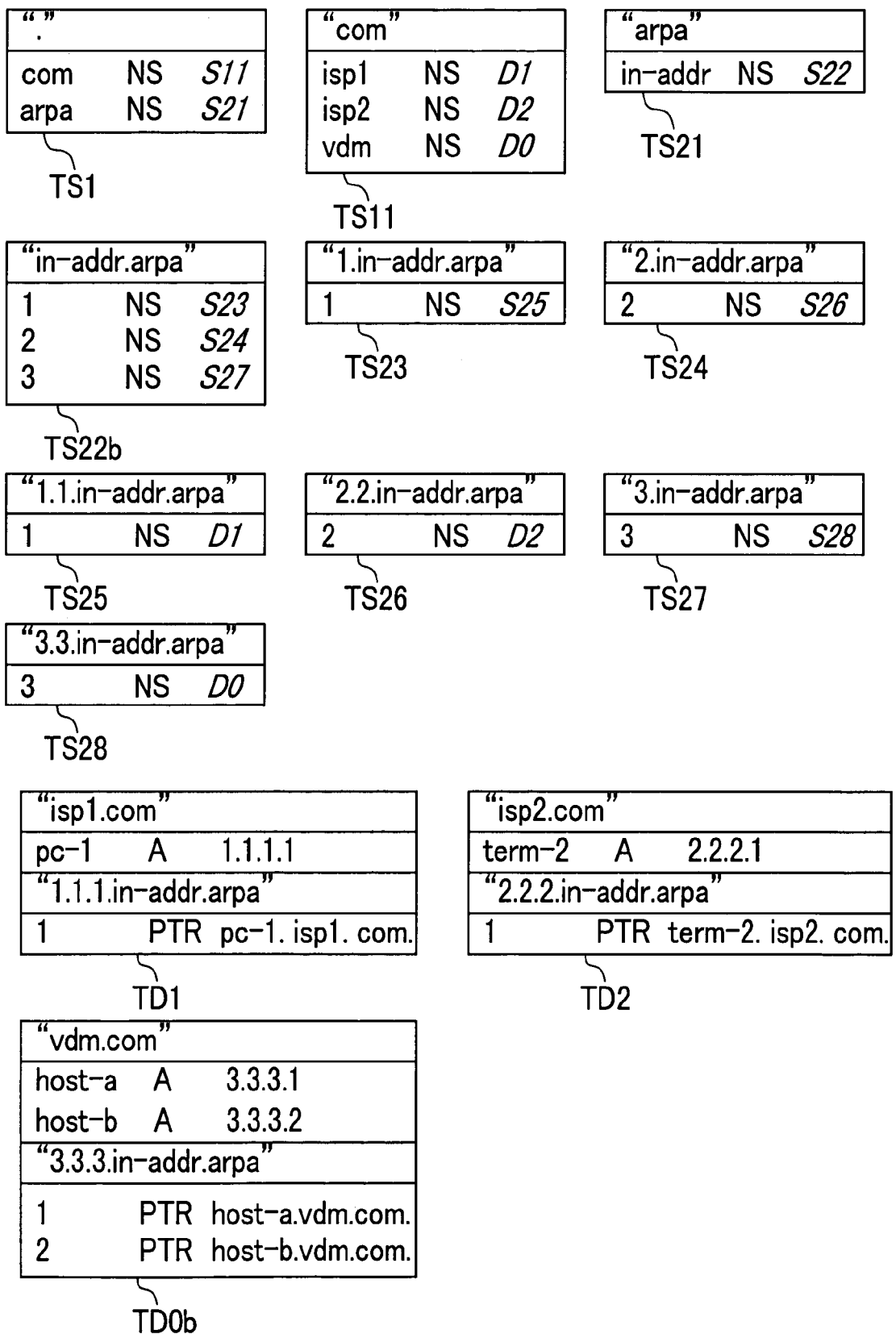
FIG. 3 illustrates exemplary contents of address to domain name mapping tables which are used for translation, held by the DNS servers in the network system of the preferred embodiment of the present invention.

FIG. 3 illustrates exemplary contents of address to domain name mapping tables which are used for translation, held by the DNS servers in the network system of the preferred embodiment of the present invention. For example, reference symbol "TS1" in FIG. 3 denotes an address to domain name mapping table held by the DNS server "S1." The contents of the table indicate that detailed information on a "com" domain is held by the DNS server S11 and detailed information abut an "arpa" domain is held by the DNS server S21.

FIG. 4 illustrates examples of address to virtual address mapping tables held by the address translation device N0 in the network system of the preferred embodiment of the present invention.

One table TN01 is used for source address to virtual source address translation and the other table TN02 is used for destination address to virtual destination address translation. When the address translation device N0 receives a packet having a source or destination address included in either table, the address translation device N0 generates a packet in which the source or destination address is replaced by the corresponding virtual address and forwards the packet. If the source address or destination address is not registered in either table for translation, the address translation device N0 forwards the packet in which the source or destination address remains unchanged. For example, if the address translation device N0 receives a packet with a "1.1.1.1" source address, it generates and forwards a packet in which the source address is replaced by "3.3.3.1" in accordance with the contents of the table TN01 for source address translation.

When a virtual address is registered on the address translation device N0 by a virtual address registration request from the DNS proxy server P0, the virtual address is registered into the table TN01 for source address translation and the table TN02 for destination address translation simultaneously.

Next, operation of the network system configured as described above will be described.

Figure 5:
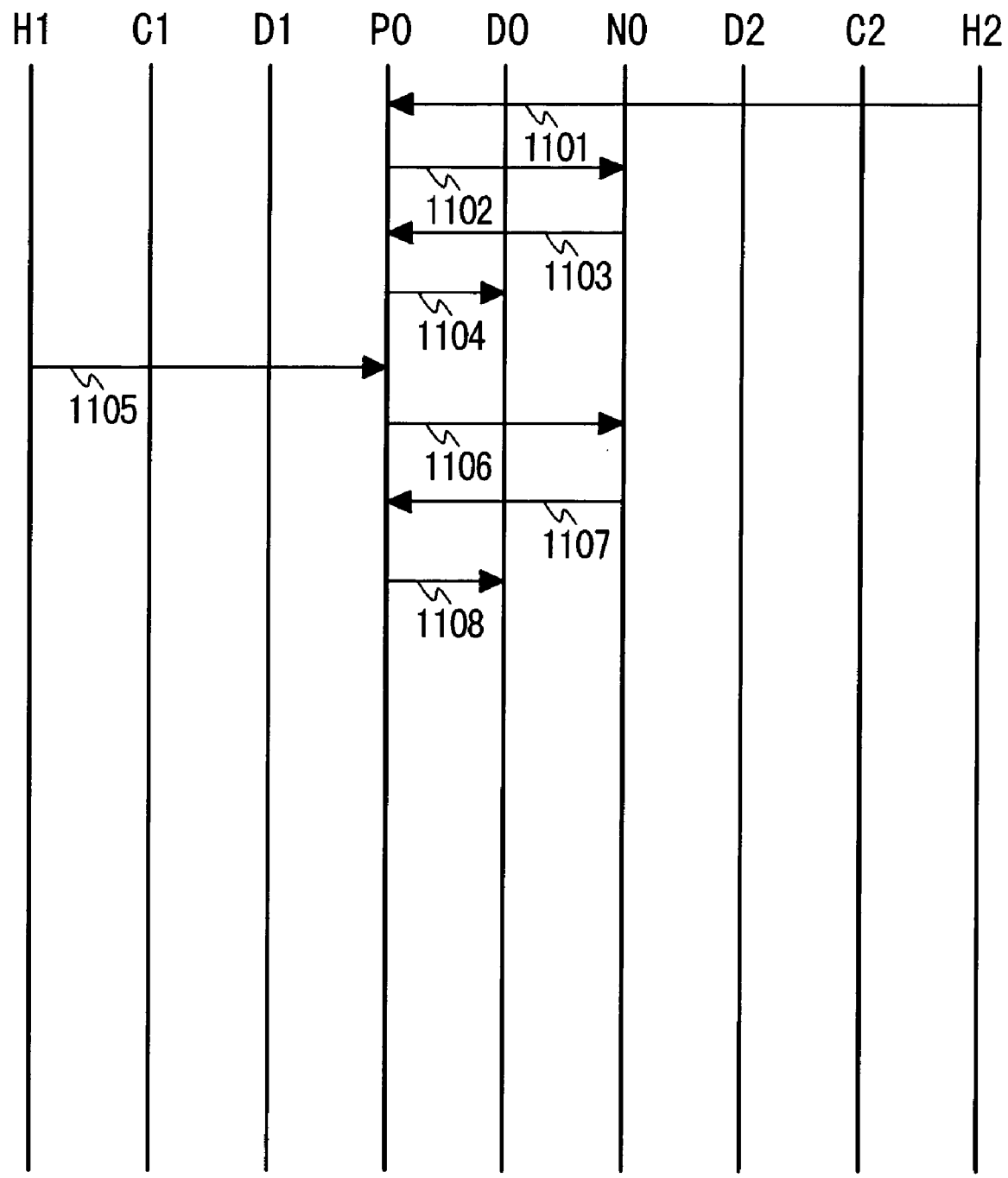
FIG. 5 is a sequence diagram explaining a process flow of dynamic DNS registration of hosts in the network system of the preferred embodiment of the present invention.

In advance of use of the network, a process flow of dynamic DNS registration of the hosts H1 and H2 which are client nodes will be explained, referring to a sequence diagram of FIG. 5.

First, the host H2 sends the dynamic DNS server D0 a dynamic DNS registration request message 1101 to register its "host-b.vdm.com" domain name and "2.2.2.1" address. This message 1101 is received by the DNS proxy server P0 on behalf of the dynamic DNS server D0. When having received the dynamic DNS registration request, the DNS proxy server P0 sends the address translation device N0 a virtual address assignment request message 1102 to get a virtual address associated with the "2.2.2.1" address specified within the registration request message. When having received the virtual address assignment request message 1102, the address translation device N0 sets a "3.3.3.2" virtual address substitutive for the "2.2.2.1" address and sends back to the DNS proxy server P0 a virtual address assignment message 1103. The DNS proxy server P0 replaces the "2.2.2.1" address within the dynamic DNS registration request by the "3.3.3.2" virtual address received from the address translation device N0 and sends the dynamic DNS server D0 a dynamic DNS registration request message 1104 to register the "host-b.vdm.com" domain name and "3.3.3.2" virtual address. The dynamic DNS server D0 sets "host-b.vdm.com" for a domain name entry of the host H2, according to the received registration request message.

DNS registration request from the host H1 is also proceeded in the same manner. The host H1 sends the dynamic DNS server D0 a dynamic DNS registration request message 1105 having its "host-a.vdm.com" domain name and "1.1.1.1" address. This message is received by the DNS proxy server P0. The DNS proxy server P0 sends the address translation device N0 a virtual address assignment request 1106 to get a virtual address associated with the "1.1.1.1" address. The address translation device N0 sends back to the DNS proxy server P0 a virtual address assignment message 1107 having a "3.3.3.1" virtual address substitutive for the "1.1.1.1" address. The DNS proxy server P0 sends the dynamic DNS server D0 a dynamic DNS registration request message 1108 having the received "3.3.3.1" virtual address and the "host-a.vdm.com" domain name. The dynamic DNS server D0 sets "host-a.vdm.com" for a domain name entry of the host H1, according to the received registration request message 1108.

Next, a procedure of a forward lookup from a domain name in the network system of the preferred embodiment of the present invention will be described.

Figure 6:
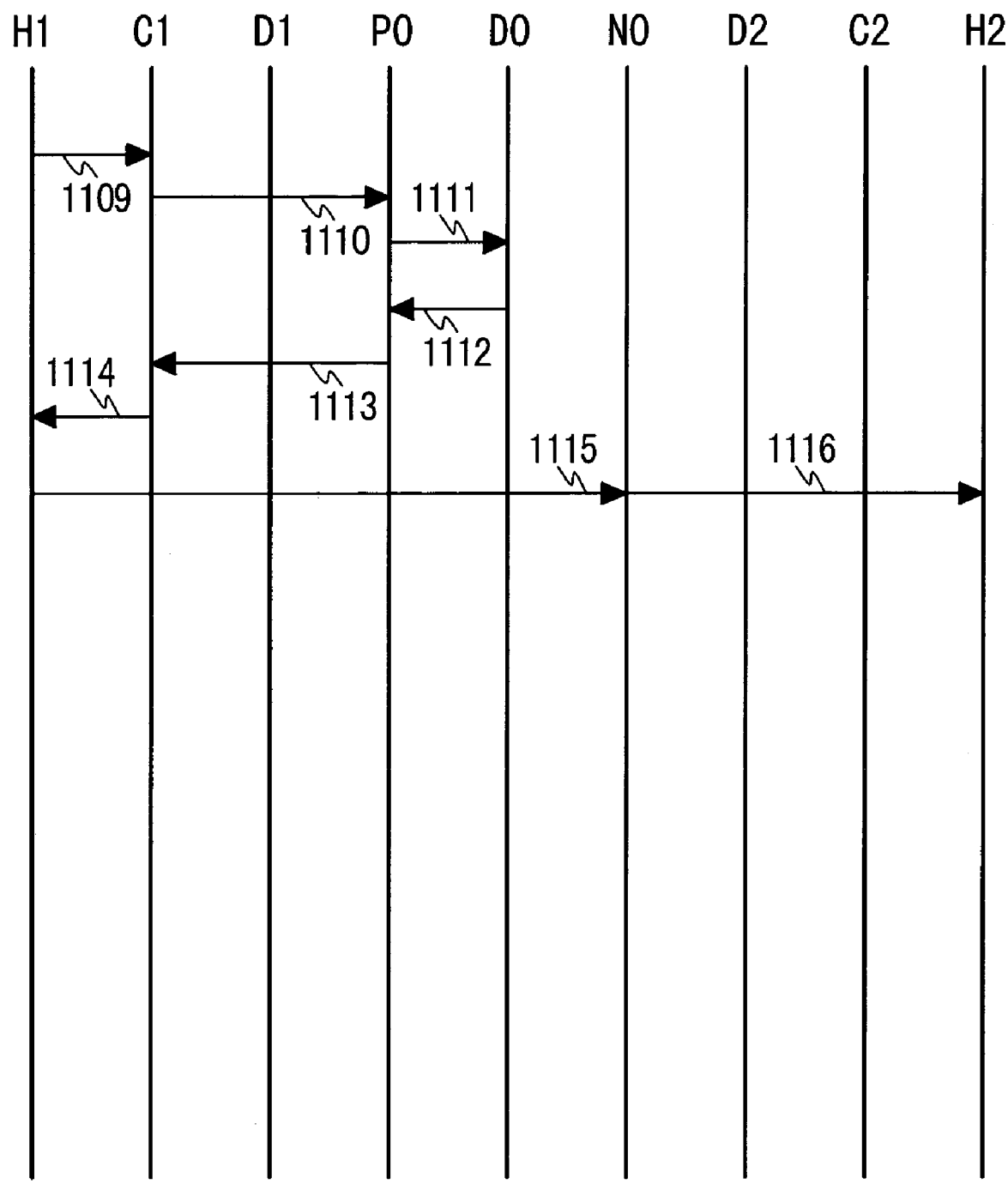
FIG. 6 is a sequence diagram explaining a process in which, by request from one host, resolving a domain name of another host is performed in the above network system.

FIG. 6 is a sequence diagram explaining a process flow in which resolving a domain name of the host H2 is performed by request from the host H1.

The host H1 sends the DNS cache server C1 in its local network a query message 1109 which requests the cache server to find a solution of address corresponding to the "host-b.vdm.com" domain name.

When having received the query message 1109, the cache server C1 issues a series of queries from the root server S1 and is notified that the DNS server S11 has the domain name to address mapping information on "com" and the DNS server D0 has such mapping information on "vdm.com". Based on this notification, then, the cache server C1 sends the DNS server D0 a query message 1110. This query message 1110 is received by the DNS proxy server P0 on behalf of the DNS server D0. Because this message content is not a DNS registration request, the DNS proxy server P0 transfers the query message 1111 to the DNS server D0.

When having received the query message 1111, the DNS server D0 refers to the table TD0b (see FIG. 3), knows that address "3.3.3.2" corresponds to "host-b.vdm.com," and sends back to the DNS proxy server P0 an answer message 1112 that the "3.3.3.2" address corresponds to the "host-b.vdm.com" domain name. The DNS proxy server P0 transfers the received answer message 1112 to the cache server C1 that issued the query (1113). The cache server C1 transfers the received answer 1113 to the host H1 (1114). The host H1 knows that the address corresponding to the "host-b.vdm.com" domain name is "3.3.3.2" from the content of the received answer message.

Then, the host H1 sets the "3.3.3.2" address obtained through the above-described procedure for the destination address and its own IP address "1.1.1.1" for the source address and starts communication with the host H2. Because the network is set so that any packet with such a virtual destination address as "3.3.3.2" will be transferred to the address translation device N0, a packet 1115 which is sent to the host H2 first arrives at the address translation device N0. The address translation device N0 replaces the "3.3.3.2" destination address of the packet 1115 by "2.2.2.1" in accordance with the address translation table TN02 (see FIG. 4), replaces the "1.1.1.1" source address by "3.3.3.1" in accordance with the address translation table TN01 (see FIG. 4), and sends a packet 1116 having the thus replaced addresses to the new destination address "2.2.2.1" (that is, the host H2). As a result, the packet from the host 1 arrives at the host H2.

When it becomes no need for a host to use its dynamic DNS registration, the host sends the DNS server D0 a deregistration request message. The DNS proxy server P0 receives the deregistration request message on behalf of the DNS server, requests the address translation device N0 to delete the host's virtual address entry, and requests the DNS server D0 to delete the host's dynamic DNS entry. Through this process, the host's dynamic DNS entry is deleted.

Next, a procedure of a reverse lookup for a domain name in the network system of the preferred embodiment of the present invention will be described.

Figure 7:
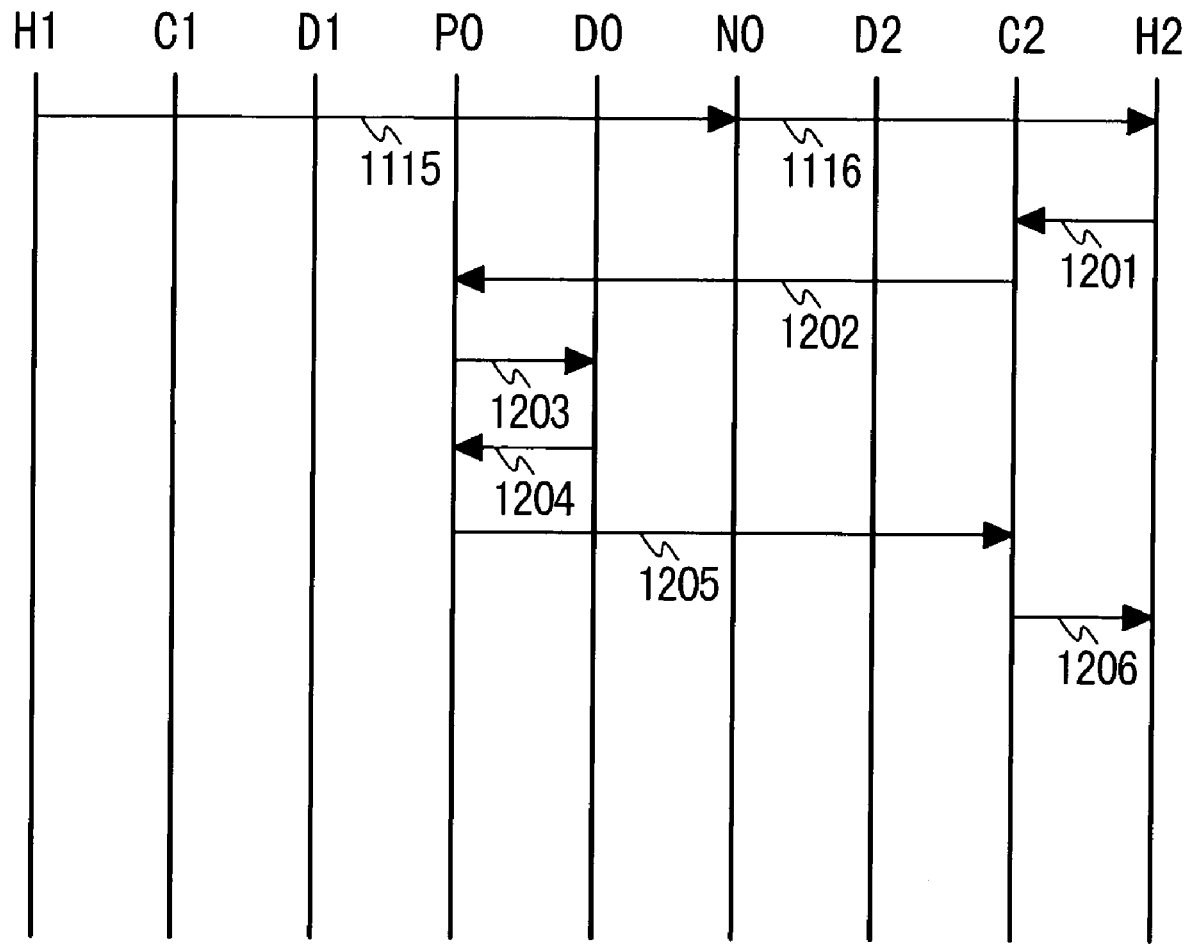
FIG. 7 is a sequence diagram explaining a process of IP address to domain name solution in the above network system.

FIG. 7 is a sequence diagram explaining a process in which IP address to domain name translation is executed. In this diagram, after the host H2 receives a packet 1116 sent from the host H1 in the sequence of FIG. 6, a procedure to be performed when the host H2 checks what domain under which the host that sent the packet has been registered is explained.

First, the host H2 sends the cache server C2 a query message 1201 which requests the cache server to execute address to domain name translation, using the "3.3.3.1" source address of the received packet 1116. When having received the query message 1201, the cache server C2 issues a series of queries from the root server S1, wherein the queries are made from a "1.3.3.3 in-addr.arpa" domain for reverse lookup contained in the above message. The cache server C2 is notified that the DNS server S21 has domain name to address mapping information on an "arpa" string, the DNS server S22 has such mapping information on an"in-addr.arpa" string, the DNS server S28 has such mapping information on a "3.in-addr.arpa" string, and the DNS server D0 has such mapping information on a "3.3.in-addr.arpa" string.

Based on this notification, the cache server C2 sends the DNS server D0 a query message 1202. This query message 1202 is received by the DNS proxy server P0 on behalf of the DNS server. Because the message content is not a DNS registration request, the DNS proxy server P0 transfers the received query message 1202 to the DNS server D0 (1203). When having received the query message 1203, the DNS server D0 refers to the table TD0b (see FIG. 3) and sends back an answer message 1204 that the "host-a.vdm.com" domain name corresponds to "1.3.3.3.in-addr.arpa". When having received the answer message 1204, the DNS proxy server P0 transfers the answer to the cache server C2 (1205) and the cache server C2 transfers the answer to the host H2 (1206). From the content of the answer message 1206 received, the host H2 can know that "host-a.vdm.com" is the domain name corresponding to the "1.3.3.3 in-addr.arpa" domain for reverse lookup, or in other words, address "3.3.3.1".

Next, the operation of the DNS proxy server P0 in the network system of the preferred embodiment of the present invention will be described.

Figure 8:
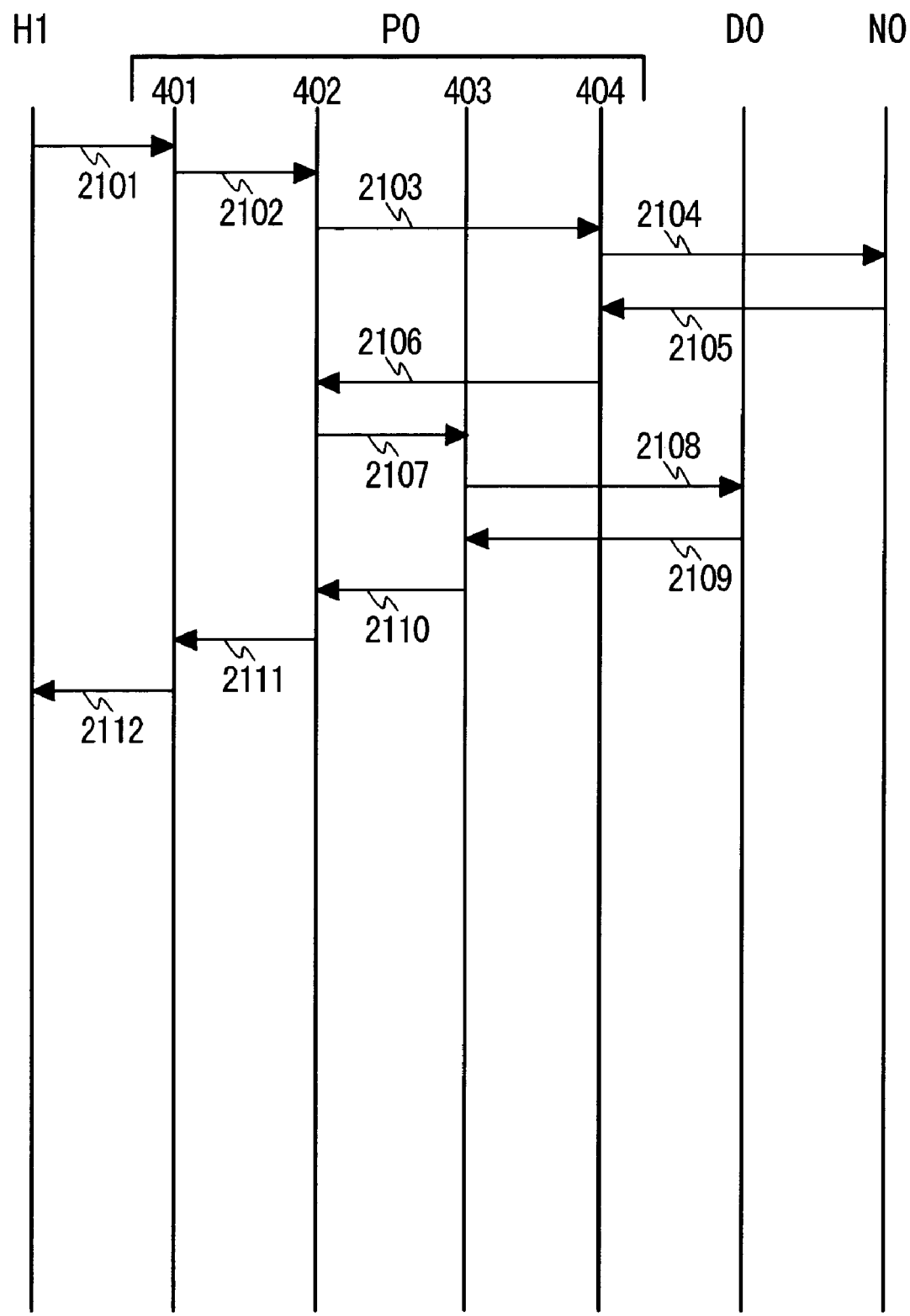
FIG. 8 is a sequence diagram of a DNS registration process which is performed by the proxy server in the network system of the preferred embodiment of the present invention.
Figure 9:
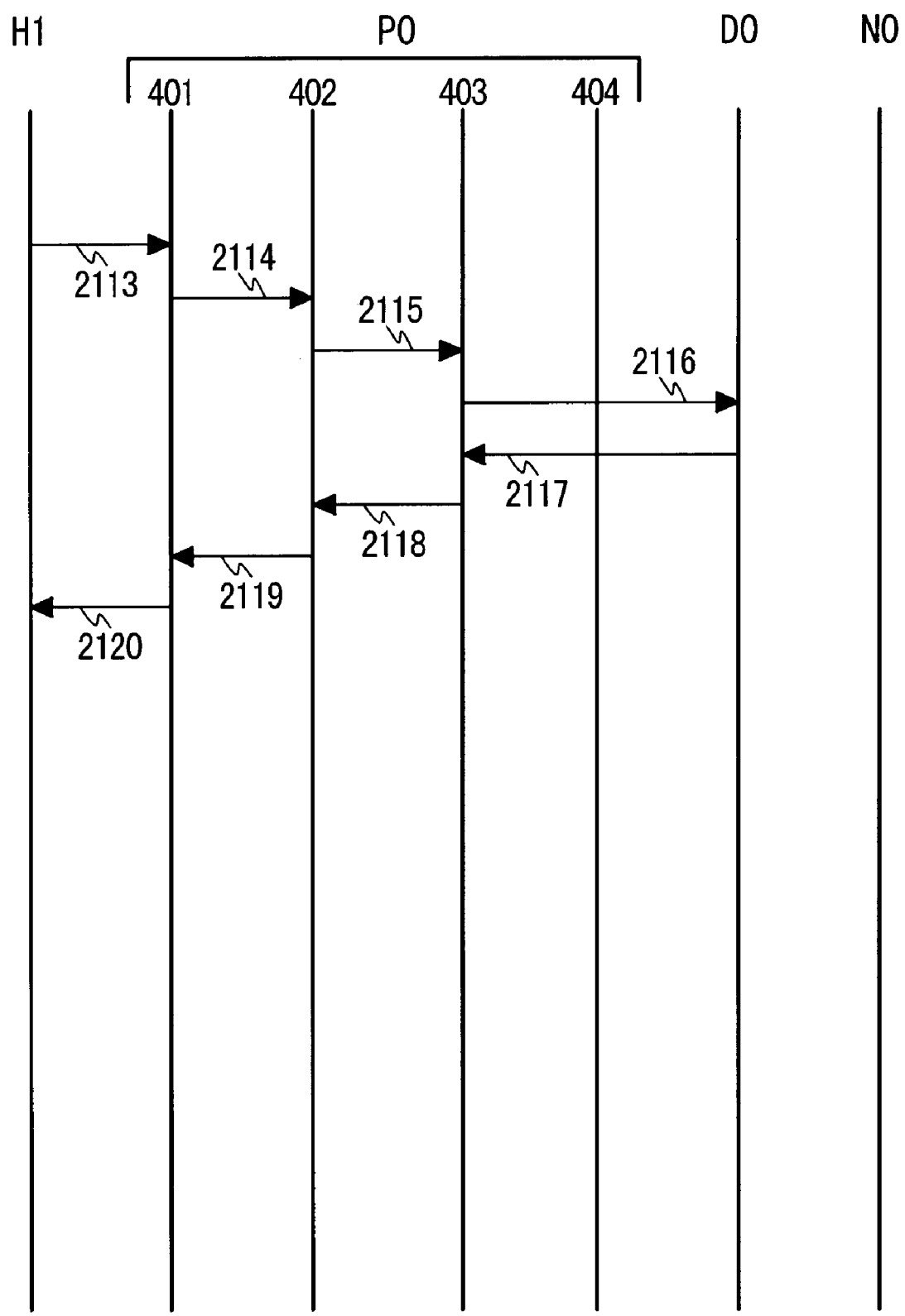
FIG. 9 is a sequence diagram of a domain name solution process which is performed by the proxy server in the above network system.
Figure 10:
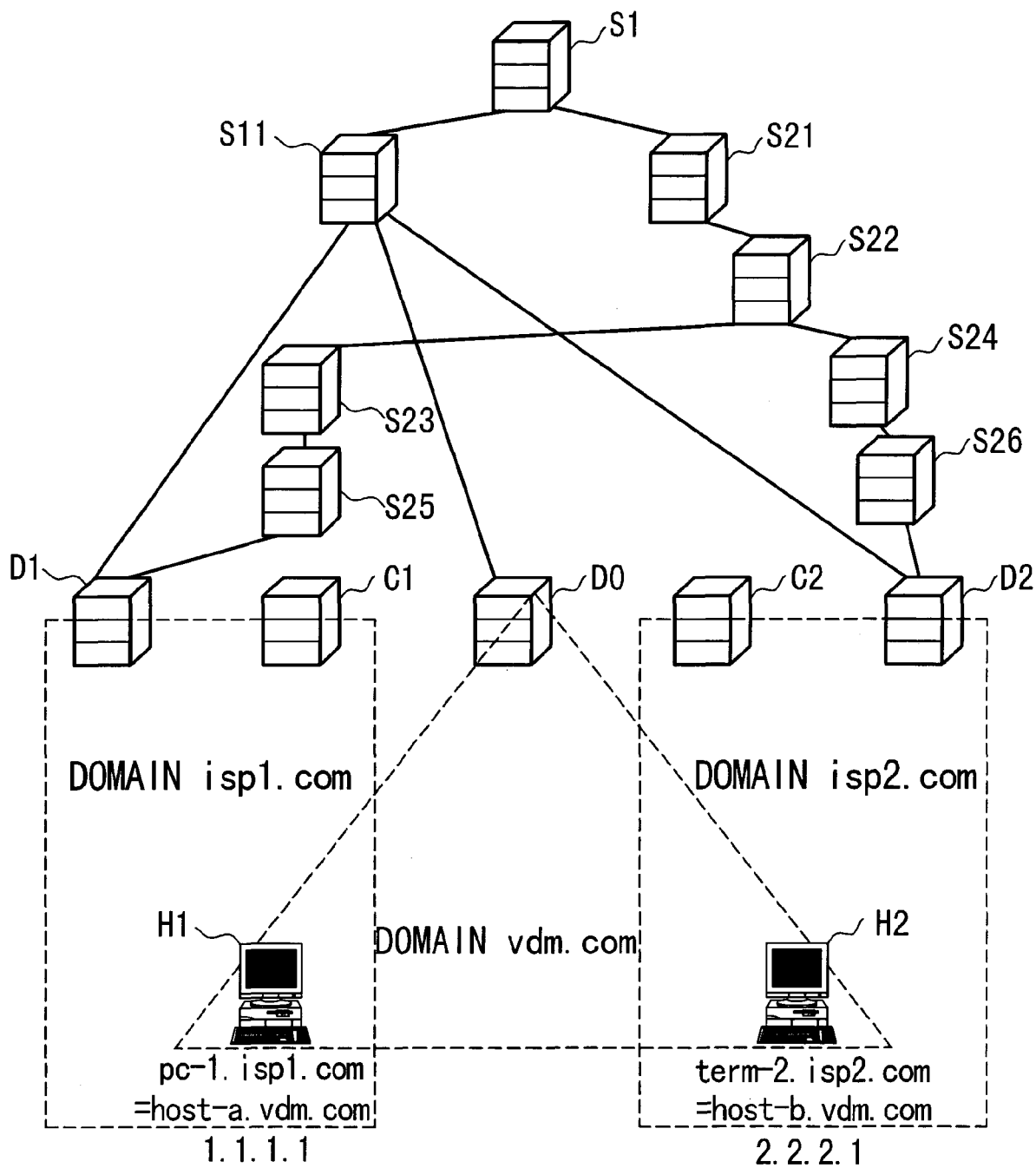
FIG. 10 is a schematic diagram showing a network system using dynamic DNS of prior art.
Figure 11:
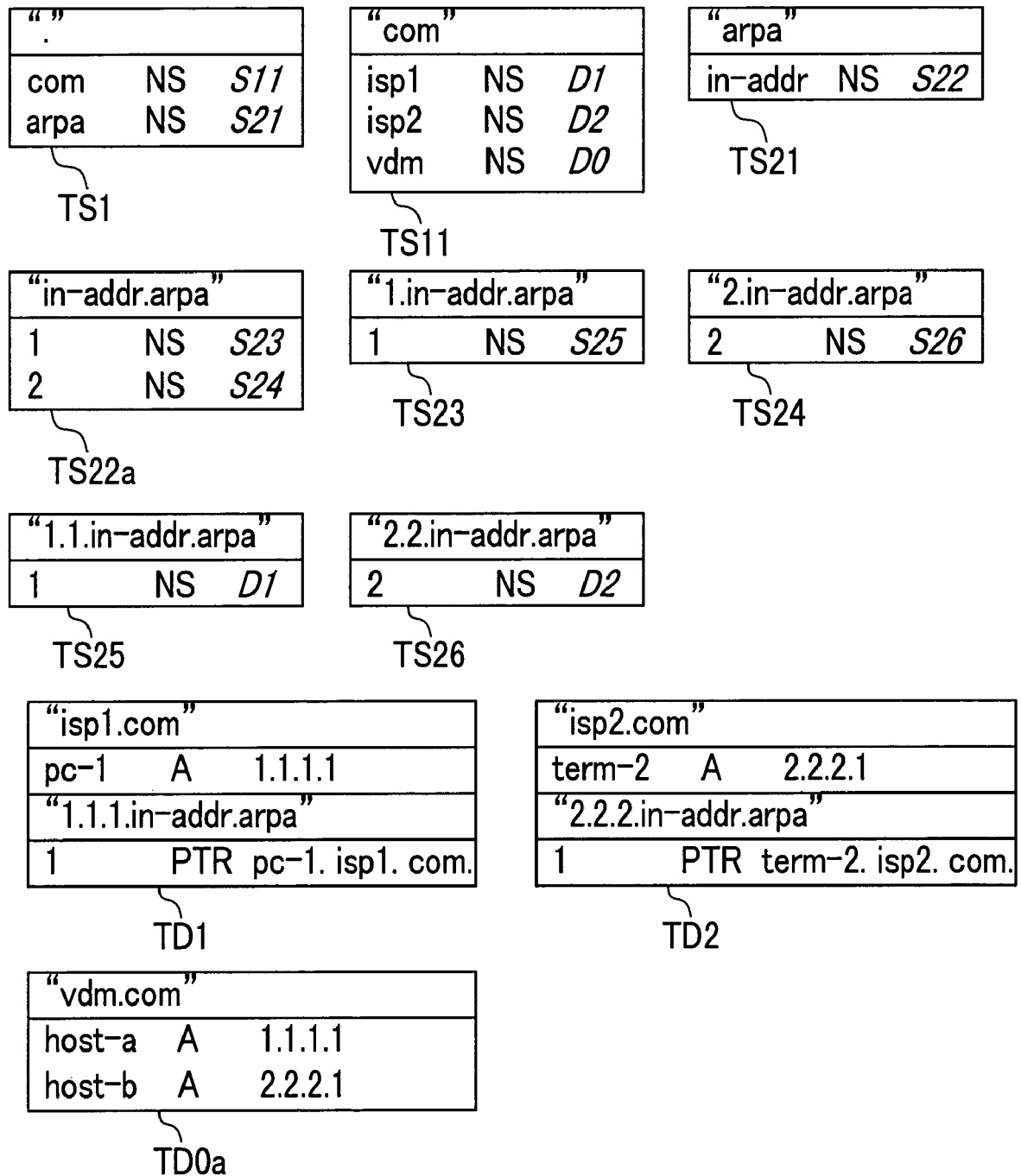
FIG. 11 illustrates examples of IP address to domain name mapping tables which are used for translation, held by the DNS servers of prior art.
Figure 12:
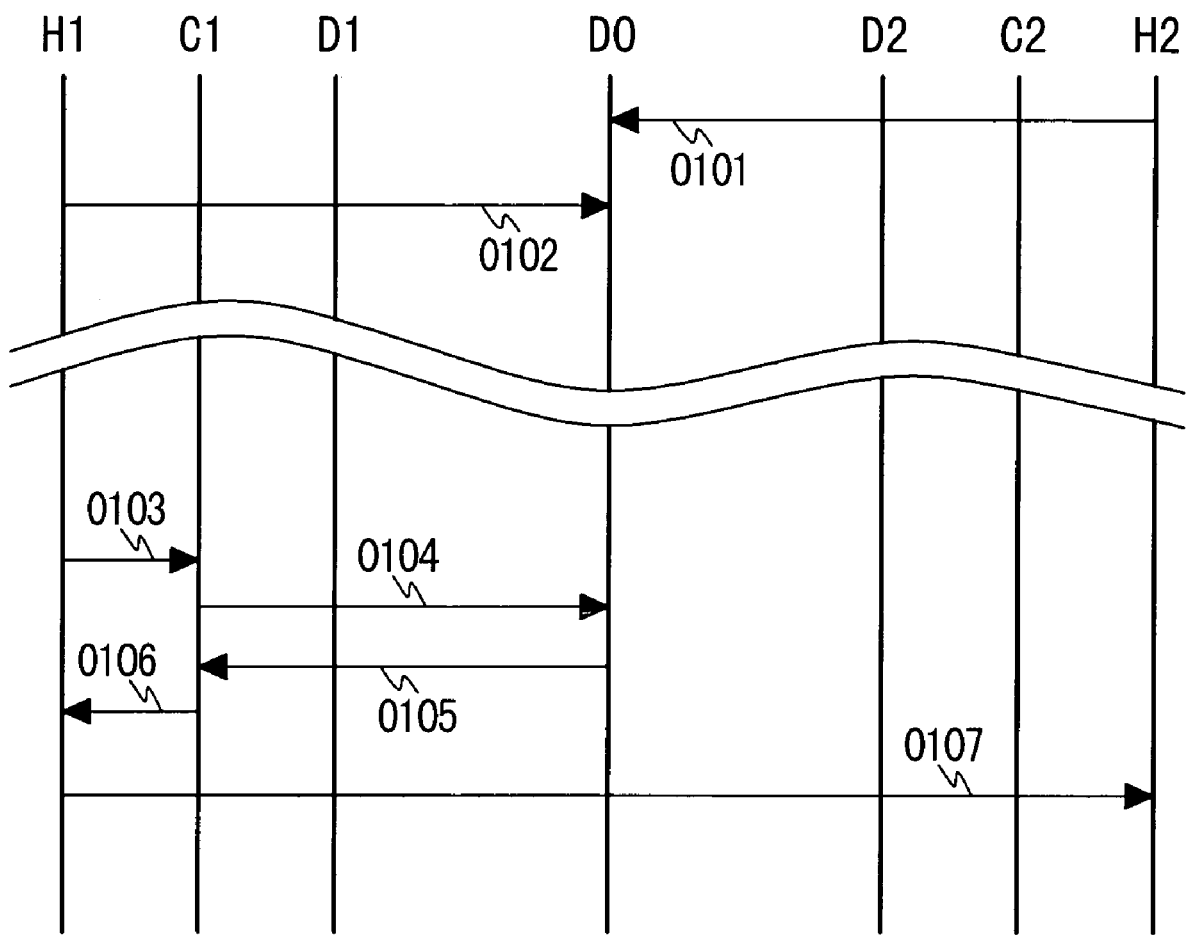
FIG. 12 is a sequence diagram explaining a process of domain name solution in the network system of prior art.
Figure 13:
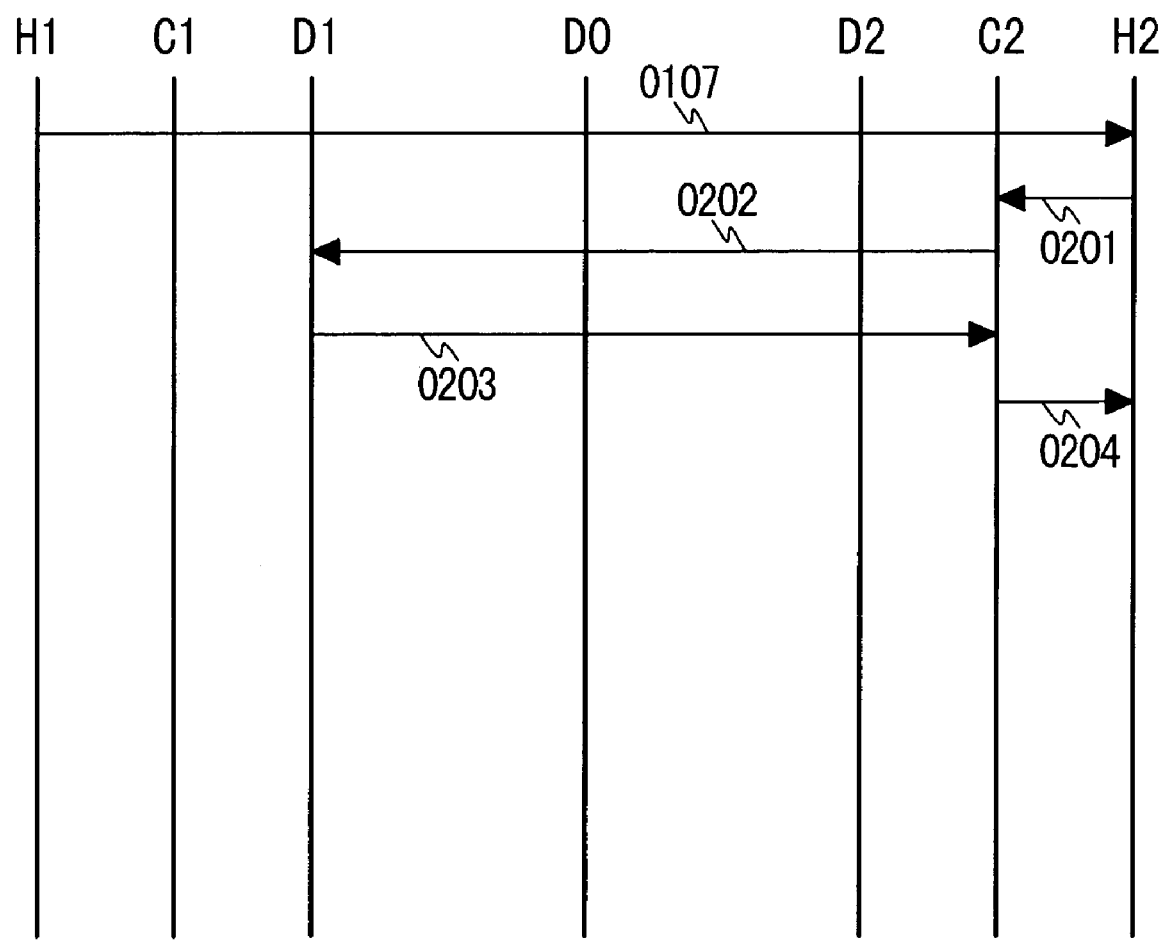
FIG. 13 is a sequence diagram explaining a process of a reverse lookup from an address to a domain name.

FIG. 8 is a sequence diagram explaining a process flow in which the proxy server P0 handles a dynamic DNS registration request issued from the host H1.

When the host H1 sends a dynamic DNS registration request message 2101 to the DNS server D0, the DNS proxy server P0 receives this message on behalf of the DNS server. The unit of communication with clients 401 receives the dynamic DNS registration request message 2101 and passes the dynamic DNS registration request to the message interpreter/manipulator 402 (2102). When the message interpreter/manipulator 402 finds that the content of the received message 2102 is a dynamic DNS registration request, it first sends a virtual address assignment request message 2103 to request virtual address assignment to the unit of communication with address translation device 404. When having received the virtual address assignment request message 2103, the unit of communication with address translation device 404 transfers the virtual address assignment request message to the address translation device N0 (2104).

When having received the virtual address assignment request message 2104, the address translation device N0 assigns a virtual address, according to the request and sends to the unit of communication with address translation device 404 a virtual address notification message 2105 to notify the DNS proxy server of the assigned virtual address. The unit of communication with address translation device 404 passes the received virtual address notification message 2105 to the message interpreter/manipulator 402 (2106).

When having received virtual address notification message 2106, the message interpreter/manipulator 402 replaces the address specified within the previously received dynamic DNS registration request 2101 by the notified virtual address and thus generates a new dynamic DNS registration request. At the same time, the message interpreter/manipulator 402 generates another dynamic DNS registration request for a reverse lookup and sends a registration request message 2107 consisting of the above two registration requests to the unit of communication with DNS servers 403. When having received the registration request message 2107, the unit of communication with DNS servers 403 sends the registration request message 2108 to the DNS server D0.

When having received the registration request message 2108, the DNS server D0 executes dynamic DNS registration, according to the request. Upon the completion of the DNS registration, the DNS server D0 sends a registration notification message 2109 back to the unit of communication with DNS servers 403. The unit of communication with DNS servers 403 passes the received registration notification message 2109 to the message interpreter/manipulator 402. The message interpreter/manipulator 402 generates a new registration confirmation message 2111 which copies the content of the received registration notification message in which, however, the virtual address is replaced by the original address of the host H1 and sends this message to the unit of communication with clients 401. The unit of communication with clients 401 transfers the received message to the host H1 (2112).

Next, a process flow in which the a message other then DNS registration (for example, a DNS name solution request, DNS address solution request, etc.) sent from the host H1 is handled will be described, referring to a sequence diagram of FIG.

The host H1 sends a DNS name solution request message 2113 via the cache server C1 to the DNS server D0. This name solution request message 2113 is received by the DNS proxy server P0 on behalf of the DNS server.

The unit of communication with clients 401 receives the name solution request and passes this request to the message interpreter/manipulator 402 (2114). When having received the name solution request message 2114, the message interpreter/manipulator 402 finds that this message is not a dynamic DNS registration request and passes the message as is to the unit of communication with DNS servers 403 (2115). When having received the name solution request message 2115, the unit of communication with DNS servers 403 transfers this message to the DNS server D0 (2116).

When having received the name solution request message 2116, the DNS server D0 performs a look-up for an IP address corresponding to a domain name specified within the request message and sends the look-up result back in a return message 2117.

The unit of communication with DNS servers 403 receives the return message 2117 and passes this return message 2117 to the message interpreter/manipulator 402 (2118). The message interpreter/manipulator 402 passes the return message 2118 as is to the unit of communication with clients 401 (2119). When having received the return message 2119, the unit of communication with clients 401 sends the return message 2120 to the host H1. The host H1 receives the return message 2120 via the cache server C1 and can know the result to the name solution request.

In the preferred embodiment of the present invention, as described hereinbefore, the DNS proxy server P0 which accepts a request on behalf of the dynamic DNS server D0 receives a request from a client on behalf of the dynamic DNS server D0 and, if the request is a DNS registration request, translates the IP address of the requester node into a virtual address assigned by the address translation device N0, and creates a DNS entry that is a mapping of this virtual address and the node's domain name. Also, the DNS proxy server P0 transfers a message other than DNS registration as is to the DNS server D0. By the advantages of DNS proxy and virtual address assignment, dynamic DNS registration using a virtual address, domain name solution using a virtual address, and packet communication using a virtual address can be performed without altering other network configurations.

While the IPv4 network example is used for illustrative purposes in the described embodiment of the present invention, the invention can be implemented in the same manner as described hereinbefore in a network that runs any other protocol such as IPv6. Also, the invention can be implemented in the same manner in a case where the DNS proxy server P0 is provided with a function of address translation across different protocols, for example, IPv4 and IPv6.

While the proxy server P0 relays messages for processing to the dynamic DNS server D0 in the network system example of the preferred embodiment of the invention, the network system may be configured such that the dynamic DNS server directly communicates with the hosts in some embodiments. Moreover, while the dynamic DNS server D0 and the address translation device N0 are independent in the illustrative network system, in some embodiments, it may be possible to integrate the address translation device N0 into the dynamic DNS server D0 or the proxy server P0.

Essential characteristics of the present invention will be recited below:

A dynamic DNS registration method in which to make host address registration with a dynamic DNS server which is capable of dynamically changing a host's address corresponding to the host's domain name. The dynamic DNS server includes an address translation means which assigns the host a virtual address corresponding to an actual address of the host. The dynamic DNS registration method comprises a step in which the address translation means assigns a virtual address to the host upon a registration request issued from the host and a step of storing a tuple of the actual address, virtual address, and domain name of the host, which are associated with each other.

The foregoing dynamic DNS registration method is further characterized as follows. The foregoing dynamic DNS server includes a proxy server which responds to a request from the host on behalf of the dynamic DNS server. The proxy server notifies the dynamic DNS server of the virtual address assigned to the host by the address translation device.

The foregoing dynamic DNS registration method is further characterized by further comprising a process which is performed by the foregoing proxy server. The process comprises the steps of requesting the address translation means to make virtual address assignment upon a registration request from a host; receiving a virtual address from the address translation means; and sending the dynamic DNS server a registration request to register the virtual address and the actual address of the host associated with the host name.

A domain name solution method in which resolving a domain name of a second host is performed by request from a first host by making query to a dynamic DNS server which is capable of dynamically changing a host's address corresponding to the host's domain name. The dynamic DNS server is provided with an address translation means which assigns the first or second host a virtual address corresponding to an actual address of the host and makes translation between the actual address and virtual address of the host. The domain name solution method comprises a first step of performing a look-up for the virtual address of the second host in accordance with a name solution request issued from the first host and a second step of sending the result of the look-up to the first host.

The foregoing domain name solution method is further characterized as follows. The foregoing name solution request is a request for domain name to address solution of the second host. The foregoing first step comprises performing a look-up for the virtual address of the second host from the second host's domain name specified within the request issued from the first host.

The foregoing domain name solution method is further characterized as follows. The foregoing name solution request is a request for address to domain name solution of the second host. The foregoing first step comprises performing a look-up for the domain name of the second host from the second host's virtual address specified within the request issued from the first host.

A method for translating source and destination addresses of a packet comprises the steps of assigning virtual addresses corresponding to the actual addresses of a source host and a destination host; if a received packet has a virtual destination address, replacing the virtual destination address of the packet by the actual address of the destination host; and replacing the source address of the packet by the virtual address of the source host.

What is claimed is:

1. A network system, comprising: a host computer; a plurality of domain name system (DNS) proxy servers in a tree structure; a dynamic DNS server; and an address translation means, wherein the plurality of DNS proxy servers register a correspondence between an actual address of the host computer and a first domain name of the host computer, wherein the dynamic DNS server is capable of dynamically changing the actual address of the host computer corresponding to a second domain name of the host computer, wherein the address translation means is configured to: generate, when the dynamic DNS server receives a registration request from the host computer, a virtual address corresponding to the actual address of the host computer to be within a range of virtual addresses that are transferred to the address translation means; transmit, when a source address of a packet transferred from the host computer is an actual address, the packet by translating the actual address to a virtual address corresponding to the actual address; transmit, when a destination address of a packet transferred from the host computer is a virtual address, the packet by translating the virtual address to an actual address corresponding to the virtual address, and wherein the dynamic DNS server is configured to: register the correspondence between the second domain name of the host computer and the generated virtual address corresponding to the actual address of the host computer as a correspondence for forward lookup and a correspondence for reverse lookup; and provide as a response, when the dynamic DNS server receives a domain name solution request which includes a reverse lookup domain name for specifying the virtual address of the host computer, and which indicates a path to reach the dynamic server via the plurality of DNS proxy servers, the second domain name corresponding to the virtual address specified within the reverse lookup domain name by checking the correspondence for the reverse lookup.

2. A domain name system (DNS) proxy server in a network system, said network system comprising a host computer, a plurality of domain name system (DNS) proxy servers in a tree structure including said DNS proxy server, a dynamic DNS server, and an address translation means, said DNS proxy server comprising: means for registering a correspondence between an actual address of the host computer and a first domain name of the host computer, wherein the dynamic DNS server is capable of dynamically changing the actual address of the host computer corresponding to a second domain name of the host computer, wherein the address translation means is configured to: generate, when the dynamic DNS server receives a registration request from the host computer, a virtual address corresponding to the actual address of the host computer to be within a range of virtual addresses that are transferred to the address translation means; transmit, when a source address of a packet transferred from the host computer is an actual address, the packet by translating the actual address to a virtual address corresponding to the actual address; and transmit, when a destination address of a packet transferred from the host computer is a virtual address, the packet by translating the virtual address to an actual address corresponding to the virtual address, and wherein the dynamic DNS server is configured to: register the correspondence between the second domain name of the host computer and the generated virtual address corresponding to the actual address of the host computer as a correspondence for forward lookup and a correspondence for reverse lookup; and provide as a response, when the dynamic DNS server receives a domain name solution request which includes a reverse lookup domain name for specifying the virtual address of the host computer, and which indicates a path to reach the dynamic server via the plurality of DNS proxy servers, the second domain name corresponding to the virtual address specified within the reverse lookup domain name by checking the correspondence for the reverse lookup.

3. The DNS proxy server according to claim 2, wherein said DNS proxy server transfers a client request other than the registration request as is to said dynamic DNS server.

4. An address translation device in a network system, said network system comprising a host computer, a plurality of domain name system (DNS) proxy servers in a tree structure, a dynamic DNS server, and said address translation device, said address translation device comprising: means for generating, when the dynamic DNS server receives a registration request from the host computer, a virtual address corresponding to the actual address of the host computer to be within a range of virtual addresses that are transferred to the address translation device, wherein the plurality of DNS proxy servers register a correspondence between an actual address of the host computer and a first domain name of the host computer, and wherein the dynamic DNS server is capable of dynamically changing the actual address of the host computer corresponding to a second domain name of the host computer; means for transmitting, when a source address of a packet transferred from the host computer is an actual address, the packet by translating the actual address to a virtual address corresponding to the actual address; and means for transmitting, when a destination address of a packet transferred from the host computer is a virtual address, the packet by translating the virtual address to an actual address corresponding to the virtual address, wherein the dynamic DNS server is configured to: register the correspondence between the second domain name of the host computer and the generated virtual address corresponding to the actual address of the host computer as a correspondence for forward lookup and a correspondence for reverse lookup; and provide as a response, when the dynamic DNS server receives a domain name solution request which includes a reverse lookup domain name for specifying the virtual address of the host computer, and which indicates a path to reach the dynamic server via the plurality of DNS proxy servers, the second domain name corresponding to the virtual address specified within the reverse lookup domain name by checking the correspondence for the reverse lookup.

5. The address translation device according to claim 4, wherein, if a received packet has a virtual destination address, said address translation device replaces the virtual destination address of the packet with the actual address of a corresponding destination host computer and replaces a source address of the packet with a corresponding virtual source address.

6. A dynamic domain name system (DNS) server comprising: an address translation means, wherein a plurality of DNS proxy servers register a correspondence between an actual address of the host computer and a first domain name of a host computer, wherein the dynamic DNS server is capable of dynamically changing the actual address of a host computer corresponding to a second domain name of the host computer, wherein the address translation means is configured to: generate, when the dynamic DNS server receives a registration request from the host computer, a virtual address corresponding to the actual address of the host computer to be within a range of virtual addresses that are transferred to the address translation means; transmit, when a source address of a packet transferred from the host computer is an actual address, the packet by translating the actual address to a virtual address corresponding to the actual address; and transmit, when a destination address of a packet transferred from the host computer is a virtual address, the packet by translating the virtual address to an actual address corresponding to the virtual address, and wherein the dynamic DNS server is configured to: register the correspondence between the second domain name of the host computer and the generated virtual address corresponding to the actual address of the host computer as a correspondence for forward lookup and a correspondence for reverse lookup; and provide as a response, when the dynamic DNS server receives a domain name solution request which includes a reverse lookup domain name for specifying the virtual address of the host computer, and which indicates a path to reach the dynamic server via the plurality of DNS proxy servers, the second domain name corresponding to the virtual address specified within the reverse lookup domain name by checking the correspondence for the reverse lookup.

* * * * *